US012613135B2

(12) United States Patent  
Kliebisch et al.

(10) Patent No.: US 12,613,135 B2  
(45) Date of Patent: Apr. 28, 2026

(54) OPTICAL DEVICE, SYSTEM AND METHOD FOR DISPERSION INTERFEROMETRY

(71) Applicant: Deutsches Zentrum für Luft- und Raumfahrt e.V., Bonn (DE)

(72) Inventors: Oliver Kliebisch, Herrenberg (DE); Peter Mahnke, Stuttgart (DE); Raoul-Amadeus Lorbeer, Magstadt (DE)

(73) Assignee: Deutsches Zentrum für Luft- und Raumfahrt e.V., Bonn (DE)

( * ) Notice: Subject to any disclaimer, the term of this patent is extended or adjusted under 35 U.S.C. 154(b) by 287 days.

(21) Appl. No.: 18/224,729

(22) Filed: Jul. 21, 2023

(65) Prior Publication Data

US 2024/0060821 A1 Feb. 22, 2024

(30) Foreign Application Priority Data

Aug. 16, 2022 (DE) .......................... 102022120607.6

(51) Int. Cl.

| | |
|---|---|
| *G01J 3/45* | (2006.01) |
| *G01J 3/10* | (2006.01) |
| *G02B 27/09* | (2006.01) |
| *G02B 27/42* | (2006.01) |
| *G02F 1/11* | (2006.01) |

(Continued)

(52) U.S. Cl.

CPC . *G01J 3/45* (2013.01); *G01J 3/10* (2013.01); *G02B 27/0905* (2013.01); *G02B 27/4233* (2013.01); *G02F 1/353* (2013.01); *G02F 1/37* (2013.01); *G01J 2003/451* (2013.01); *G02F 1/11* (2013.01); *G02F 1/3532* (2013.01)

(58) Field of Classification Search

CPC .......... G01J 3/45; G01J 3/10; G01J 2003/451; G02B 27/0905; G02B 27/4233; G02F 1/353; G02F 1/37; G02F 1/11; G02F 1/3532

USPC ......................................................... 356/484

See application file for complete search history.

(56) References Cited

U.S. PATENT DOCUMENTS

| | | | |
|---|---|---|---|
| 5,394,240 A | 2/1995 | Matsumoto | |
| 5,642,195 A * | 6/1997 | Drachev | ................ G01N 21/45 |
| | | | 356/491 |
| 5,748,313 A | 5/1998 | Zorabedian | |

(Continued)

FOREIGN PATENT DOCUMENTS

| | | | | |
|---|---|---|---|---|
| JP | H05302810 A * | 4/1992 | ............. | G01B 9/02 |
| JP | H10132514 A * | 5/1998 | ............. | G01B 11/00 |

OTHER PUBLICATIONS

Lee, Jae-seok, et al. "Development of a forward model for Bayesian analysis of a single crystal dispersion interferometer." Review of Scientific Instruments 92.3 (2021). (Year: 2021).*

(Continued)

*Primary Examiner* — Michelle M Iacoletti  
*Assistant Examiner* — Noah J. Haney  
(74) *Attorney, Agent, or Firm* — WRB-IP PLLC

(57) ABSTRACT

An optical device, a system and a method for dispersion interferometry includes a frequency doubling device and an optical modulation device, a transmission beam path which is configured to emit a first and second measurement beam on an optical element and a reception beam path which is configured to receive a first and second measuring beam returned by the optical element.

20 Claims, 5 Drawing Sheets

(51) Int. Cl.
  *G02F 1/35* (2006.01)
  *G02F 1/37* (2006.01)

(56) References Cited

U.S. PATENT DOCUMENTS

| | | | | |
|---|---|---|---|---|
| 6,137,574 | A * | 10/2000 | Hill | G01B 9/02083 |
| | | | | 356/486 |
| 6,246,481 | B1 | 6/2001 | Hill | |
| 8,760,661 | B2 | 6/2014 | Cui | |
| 11,378,863 | B1 * | 7/2022 | Lührmann | G02F 1/113 |
| 2002/0180977 | A1 * | 12/2002 | Fu | G01J 9/02 |
| | | | | 356/450 |
| 2021/0199575 | A1 * | 7/2021 | Wessel | G01B 9/02011 |
| 2022/0065612 | A1 * | 3/2022 | Yamada | H01S 5/0085 |
| 2022/0178752 | A1 | 6/2022 | Watanabe et al. | |

OTHER PUBLICATIONS

German Official Action (Apr. 14, 2023) for corresponding German App. DE 102022120607.6.

Irby, J. [ et al.]: A two-color interferometer using frequency doubled diode pumped laser for electron density measurements. In: Review of Scientific Instruments, vol. 70, 1999, No. 1, S. 699-702.

Lee, Dong-Geun [ et al.]: The new single crystal dispersion interferometer installed on KSTAR and its first measurement. In: Review of Scientific Instruments, vol. 92, 2021, S. 033536-1-033536-6.

Search Report with Comments on Search Report in corresponding French Application No. FR2308734, dated Sep. 29, 2025, 8 pages.

* cited by examiner

OPTICAL DEVICE, SYSTEM AND METHOD FOR DISPERSION INTERFEROMETRY

BACKGROUND AND SUMMARY

The invention relates to an optical device, as well as a system and a method for dispersion interferometry with such an optical device.

Measuring the dispersion or the refractive index of air is a known method and can be used to measure atmospheric parameters such as density, pressure, temperature, air humidity, and $CO_2$ content. The refractometers or interferometers used for this purpose are usually used in laboratory environments where the necessary mechanical stability of the structure is provided.

In a variant of dispersion interferometry, the use of non-linear optics can significantly reduce the susceptibility to mechanical disturbances such as vibrations and microphony. This variant is used in plasma research at fusion research facilities to measure electron densities and must function reliably in large research facilities in acoustically heavily influenced environments.

DE 44 03 021 C2 describes a high-precision air refractometer with a laser beam source for emitting a laser beam, a first nonlinear optical crystal for receiving the laser beam and converting a part thereof to a first second-harmonic wave, a reflective component for reflecting the laser beam and the first second-harmonic wave, a transport means for transporting the reflective component, a second nonlinear optical crystal for receiving the laser beam and the first second-harmonic wave reflected by the reflective component, and for converting another part of the laser beam into one second second-harmonic wave and for generating interference fringes by interference between the first second-harmonic wave and the second second-harmonic wave, and means for counting the interference fringes generated at a detector for dividing the number of counted interference fringes by a distance, by which the reflective component is movable, and multiplying the result by a coefficient.

DE 697 35 148 T2 describes an optical correction device, in which the signal-to-noise ratio of a correction signal used for second-harmonic interferometry is improved in two ways. First, an optical amplifier tuned to the second harmonic frequency is positioned in the optical path. Second, a doubling stage is positioned within the correction laser. A frequency doubled intracavity laser emits a first optical beam at a fundamental frequency and a second optical beam at the second harmonic of the fundamental frequency.

The frequency doubled laser is positioned adjacent to a phase modulator. A first beamsplitter is positioned near the phase modulator.

A second beamsplitter is positioned between a reference laser, a quarter wave plate and a face of the first beamsplitter. A stage mirror is positioned close to the quarter wave plate. The system is designed to measure the stage mirror position. An external doubling crystal is positioned near an opposite face of the first beamsplitter. An optical amplifier tuned to the second harmonic frequency is positioned between the external doubling stage and a filter such as a dichroic beamsplitter. The filter prevents transmission of the first optical beam containing the fundamental frequency. A quadratic photodetector is positioned near the filter.

It is desirable to create an improved optical device with a low susceptibility to faults.

It is also desirable to provide a system for dispersion interferometry with an improved optical device with a low susceptibility to failure.

It is also desirable to provide a method for dispersion interferometry using such an improved optical device.

According to one aspect of the invention, an optical device is proposed, at least comprising a laser beam source for emitting a first laser beam with a fundamental frequency of the laser beam source; a frequency doubling device and an optical modulation device for generating a second laser beam at a frequency of a second harmonic of the fundamental frequency, and a first diffracted laser beam having an intensity of the first diffraction order of a modulated fundamental frequency, and a second diffracted laser beam having an intensity of the second diffraction order of the has second harmonics. Furthermore, the device comprises a reference beam path, which is designed to image a first and second reference beam onto a receiving unit; a transmission beam path, which is designed to emit a first and second measurement beam onto an optical element.

Furthermore, the device comprises a reception beam path, which is designed to receive a first and second measurement beam returned by the optical element. The device also includes a superposition unit which is designed for superimposing the first and second reference beams on the returned first and second measurement beams and for imaging the superimposed returned first and second measurement beams and first and second reference beams onto the receiving unit.

The receiving unit is designed to receive the superimposed, returned first and second measurement beams and first and second reference beams and to convert them into an electrical reception signal.

The device also includes an evaluation unit which is configured to at least evaluate the electrical reception signal.

The proposed optical device can advantageously be used to optically determine the density of a gas mixture through which the first and second measurement beams pass in the transmission beam path and reception beam path, with high accuracy and bandwidth, and thus infer the pressure of the gas mixture. The optical device advantageously has a low susceptibility to interference from environmental conditions, such as vibrations. In addition, the optical device has a compact structure and requires a small number of components.

The evaluation unit is designed to receive and digitize the electrical reception signal.

In the proposed optical device, a modulation device, for example an acousto-optical frequency shifter, is used to generate the diffracted laser beams in such a way that when applying signal with a modulation frequency, the first diffraction order for the fundamental frequency of the laser beam source is used to generate a first diffracted laser beam and the second diffraction order for the second harmonic is used for generating a second diffracted laser beam.

Due to the diffraction equation, these two beams have the same diffraction angle and are therefore intrinsically collinear. As a result, the stability of the system can advantageously be increased and the number of components can be reduced.

The optical element advantageously reflects or scatters the measurement signals.

Advantageously, the diffracted laser beams can be used as reference beams and the non-diffracted laser beams can be used as measurement beams. Alternatively, however, it is also possible to use the non-diffracted laser beams as reference beams and the diffracted laser beams as measurement beams.

The first and second partial beams contained in the reference beam each have a frequency shift that differs by a factor of two. In the event of interference with the returned measurement beams as a measuring signal, beat signals are formed at precisely these frequency shifts.

The measurement signals are thus intrinsically divided into two different frequency bands. In contrast to the prior art, this enables detection using a single detector without signal mixing. This in turn can reduce the number of components required.

The dispersion phases and the relative dispersion are determined purely numerically and/or digitally directly from the photodiode signal of the receiving unit in an evaluation unit, which can comprise an analog-to-digital converter and a mixer to downmix the received signals to low frequencies. Compared to the prior art, a second non-linear optical frequency conversion stage, but also an electrical frequency conversion stage, can thus be dispensed with. This increases the stability of the system and reduces the number of components. In addition, the system achieves significant measuring accuracy even with small amounts of measurement light.

Multiple, non-common optical path components for the individual measurement frequencies, which partially negate the advantage of mechanical robustness, can be avoided.

The optical device also has only one receiving unit, for example a photodiode, in order to detect the respective modulated signals separately, and thus advantageously requires fewer components.

According to an advantageous embodiment of the optical device, the first and second measurement beam can be designed as a first and second laser beam and the first and second reference beam can be designed as a first and second diffracted laser beam. Alternatively, the first and second measurement beam can also be designed as a first and second diffracted laser beam and the first and second reference beam can be designed as a first and second laser beam.

The two orders of diffraction are advantageously imaged with the same diffraction angle due to the connection between the fundamental frequency and second harmonic, so that the two diffracted laser beams are collinear.

According to an advantageous embodiment of the optical device, the frequency doubling device can be arranged in the transmission beam path before the optical modulation device. In this way, the second laser beam with the second harmonic of the fundamental frequency is first generated before the two diffracted laser beams are then generated from the two optical beams by means of the modulation device.

According to an advantageous embodiment of the optical device, the frequency doubling device is arranged in the transmission beam path after the optical modulation device.

In this alternative embodiment, the first diffracted laser beam is generated from the first laser beam with the fundamental frequency by means of the modulation device before the second laser beam with the second harmonic is generated from the first laser beam by frequency doubling and the second diffracted laser beam is generated from the first diffracted laser beam. For reasons of arrangement, two separate frequency doubling devices may be required for the first and second laser beams and for the two diffracted laser beams.

According to an advantageous embodiment of the optical device, the frequency doubling device can have at least one wedge, by means of which an offset angle between the first laser beam and the second laser beam can be compensated by at least one wedge. In this way the optical beams of the fundamental frequency and the second harmonic can pass collinearly through the structure of the optical device.

According to an advantageous embodiment of the optical device, the first and second diffracted laser beams can be emitted collinearly at an angle greater than 0 mrad relative to the first and second laser beams. In particular, the angle can be at most 50 mrad, preferably at most 10 mrad. Advantageously, the two diffracted laser beams can be emitted at an angle that is as small as possible relative to the first and second laser beams, in order to achieve a compact arrangement of the optical device.

According to an advantageous embodiment of the optical device, the superposition unit can be designed as a beamsplitter, wherein the returned first and second measurement beam passing through the superposition unit and the first and second reference beam are reflected by the superposition unit. Alternatively, the returned first and second measurement beam can be reflected by the superposition unit and the first and second measurement beam and the first and second reference beam can pass through the superposition unit.

The beamsplitter can be provided, for example, as a semi-transparent mirror, so that the returned first and second measurement beam can pass through the beamsplitter unhindered coming from a rear side of the mirror, while the first and second reference beam coming from the other side are deflected in such a way that both the returned first and second measurement beam and first and second reference beam are superimposed.

Alternatively, the first and second measurement beam and the first and second reference beam can pass through the beamsplitter coming from the rear side of the mirror, while the returned first and second measurement beam coming from the other side are deflected in such a way that both the returned first and second measurement beam and first and second reference beam are superimposed.

According to an advantageous embodiment of the optical device, a normal vector of the beamsplitter surface can lie on a bisector between the reference beams and the returned measurement beams. The first and second reference beam can thus pass through the beamsplitter coming from the rear side of the mirror, while the returned first and second measurement beam coming from the other side are deflected in such a way that returned first and second measurement beam and first and second reference beam are superimposed. In this way, the received light can advantageously be reflected onto the reference beam and caused to interfere.

According to an advantageous embodiment of the optical device, an optical system for beam adjustment can be arranged in the reference beam path and/or in the transmission beam path and/or in the reception beam path. The optical system can advantageously be used to adjust beam propagation, which extends differently in the reference beam path and the transmission or reception beam path, so that interference of the beams is maximized. The optical system can be a lens system, for example. Alternatively, the optical system can also include mirrors and/or holographic elements.

According to an advantageous embodiment of the optical device, a beam deflection unit can be arranged in the transmission beam path and/or in the reception beam path, which unit splits the transmission beam path and/or the reception beam path into at least a first beam path and a second beam path.

In particular, the first beam path or the second beam path can be selected as the transmission beam path and/or as the reception beam path by means of the beam deflection unit.

Advantageously, the measurement beam can be guided differently through a measuring volume by beam offset or beam deflection, for example by a scanner, so that a suitable optical element in the form of a reflector or scatterer is impinged upon. By varying the measuring distance, free parameters in the evaluation of the measured phases can be calibrated against the pressure or the gas concentration without having to resort to additional measuring systems.

Typical methods to manipulate the optical beam are, for example, polarizing beamsplitters and a polarization rotating element such as a rotatable lambda/2 plate, as well as rotatable prisms or mirrors, liquid crystals and the like.

According to an advantageous embodiment of the optical device, at least one mirror for deflecting the first and second reference beam and/or the first and second measurement beam and/or the returned first and second measurement beam can be arranged in the reference beam path and/or in the transmission beam path and/or in the reception beam path. As a result, the structure of the optical device can be made even more compact.

According to a further aspect of the invention, a system for dispersion interferometry is proposed which comprises at least one such optical device as described above.

The proposed system for dispersion interferometry with such an optical device can advantageously be used to optically determine the density of a gas mixture through which the first and second measurement beams pass in the transmission beam path and reception beam path, with high accuracy and bandwidth, and thus infer the pressure of the gas mixture. The system advantageously has a low susceptibility to interference from environmental conditions, such as vibrations. In addition, the optical device is compact in design and requires only a small number of components, so that the entire system can be designed to be cost-effective and in an optimal manner with regard to installation space.

The dispersion phases and the relative dispersion are determined purely numerically and/or digitally directly from the photodiode signal of the receiving unit in an evaluation unit, which can include an analog-to-digital converter and a mixer to downmix the received signals to low frequencies. Compared to the prior art, a second non-linear optical frequency conversion stage, but also an electrical frequency conversion stage, can thus be dispensed with. This increases the stability of the system and reduces the number of components. In addition, the system achieves significant measuring accuracy even with small amounts of measurement light.

According to a further aspect of the invention, a method for dispersion interferometry with an optical device is proposed, wherein the method comprises at least: emitting a first laser beam by means of a laser beam source having a fundamental frequency of the laser beam source; generating a second laser beam at a frequency of a second harmonic of the fundamental frequency, as well as a first diffracted laser beam, which has an intensity of the first diffraction order of a modulated fundamental frequency, and a second diffracted laser beam, which has an intensity of the second diffraction order of the second harmonic, by means of a frequency doubling device and an optical modulation device; imaging a first and second reference beam in a reference beam path onto a receiving unit; emitting a first and second measurement beam in a transmission beam path onto an optical element; receiving a first and second measurement beam returned by the optical element in a reception beam path; superimposing the returned first and second measurement beams on the first and second reference beams by a superposition unit and imaging onto the receiving unit; receiving the superimposed returned first and second measurement beams and first and second reference beams by the receiving unit and converting into an electrical reception signal; evaluating the electrical reception signal by an evaluation unit.

The proposed method for dispersion interferometry can advantageously be used to optically determine, with an optical device, the density of a gas mixture through which the first and second measurement beams pass in the transmission beam path and reception beam path, with high accuracy and bandwidth, and thus infer the pressure of the gas mixture. The method advantageously has a low susceptibility to interference from environmental conditions, such as vibrations.

Advantageously, the evaluation unit can also receive and digitize the electrical reception signal.

The optical element advantageously reflects or scatters the measurement signals.

In the proposed method, a diffracted laser beam is generated by a modulation device, such as an acousto-optical frequency shifter, in such a way that when applying a signal with a modulation frequency, the first diffraction order for the fundamental frequency of the laser beam source is used for generating a first diffracted laser beam and the second diffraction order for the second harmonic is used for generating a second diffracted laser beam.

Due to the diffraction equation, these two beams have the same diffraction angle and are therefore intrinsically collinear.

Advantageously, the diffracted laser beams can be used as reference beams and the non-diffracted laser beams as measurement beams. Alternatively, however, it is also possible to use the non-diffracted laser beams as reference beams and the diffracted laser beams as measurement beams.

The first and second partial beams contained in the reference beam each have a frequency shift that differs by a factor of two. In the event of interference with the returned measurement beams as a measuring signal, beat signals are formed at precisely this frequency shift. The measurement signals are thus intrinsically divided into two different frequency bands. In contrast to prior art, this enables detection using a single detector to be obtained without signal mixing.

The dispersion phases and the relative dispersion are determined purely numerically and/or digitally directly from the photodiode signal of the receiving unit. Compared to the prior art, a second non-linear optical frequency conversion stage, but also an electrical frequency conversion stage, can thus be dispensed with. In addition, the system achieves significant measuring accuracy even with small amounts of measurement light.

According to an advantageous embodiment of the method, the first and second laser beam can be used as the first and second measurement beam and the first and second diffracted laser beam can be used as the first and second reference beam. Alternatively, the first and second diffracted laser beam can also be used as a the first and second measurement beam and the first and second laser beam can be used as the first and second reference beam. A diffracted laser beam can thus be generated by a modulation device, in such a way that when applying a signal with a modulation frequency, the first diffraction order for the fundamental frequency of the laser beam source is used for generating a first diffracted laser beam and the second diffraction order for the second harmonic is used for generating a second diffracted laser beam.

The two orders of diffraction are advantageously imaged with the same diffraction angle due to the connection between the fundamental frequency and second harmonic, so that the two diffracted laser beams run collinearly.

According to an advantageous embodiment of the method, the second laser beam can be generated by the frequency doubling device and the first and second diffracted laser beam can be generated from the first and second laser beam by frequency modulation with a modulation frequency in the optical modulation device. Thus, the frequency doubling device can expediently be arranged in the transmission beam path before the optical modulation device.

According to an advantageous embodiment of the method, the first diffracted laser beam can be generated by frequency modulation with the modulation frequency in the optical modulation device and the second laser beam and the second diffracted laser beam can be generated by the frequency doubling device. Thus, the frequency doubling device can be advantageously arranged in the transmission beam path after the optical modulation device.

According to an advantageous embodiment of the method, an offset angle between the first laser beam and the second laser beam can be compensated by at least one wedge. In this way it can be achieved that the optical beams of the fundamental frequency and the second harmonic pass collinearly through the structure of the optical device.

According to an advantageous embodiment of the method, the first and second diffracted laser beams can be emitted collinearly at an angle to the first and second laser beams. In particular, the angle can be at most 50 mrad, preferably at most 10 mrad. Advantageously, the two diffracted laser beams can be emitted at an angle that is as small as possible relative the first and second laser beams, in order to achieve a compact arrangement of the optical device.

According to an advantageous embodiment of the method, the returned first measurement beam can be superimposed on the first reference beam and the returned second measurement beam can be superimposed on the second reference beam by the superposition unit. The partial beams contained in the reference beam each have a frequency shift that differs by a factor of two. In the event of interference with the returned measurement beams as a measuring signal, beat signals are formed at precisely these frequency shifts.

The measurement signals are thus intrinsically divided into two different frequency bands. Phase differences of the superimposed optical beams can thus be advantageously evaluated and used to determine the relative dispersion.

According to an advantageous embodiment of the method, the electrical reception signal can be demodulated and/or filtered in the evaluation unit. In particular, the electrical reception signal can be demodulated in the evaluation unit by means of quadrature demodulation and filtered with a low-pass filter.

As an alternative or in addition, the electrical reception signal can be mixed before the quadrature demodulation in the evaluation unit by a two-tone signal offset from the fundamental frequency, in particular with the modulation frequency. In this way, advantageously high modulation frequencies can be used in the optical modulation device and low sampling rates can be used in the evaluation unit.

In this way, the two band-limited reception signals can be quadrature-demodulated and low-pass filtered by means of digital signal processing. The relative dispersion between the fundamental wavelength and the second harmonic can be determined by numerical difference formation. The relative dispersion is directly dependent on the environmental parameters (pressure, temperature, air humidity, $CO_2$ content) and thus enables these parameters to be measured. The purely digital processing simplifies the measurement setup considerably.

According to an advantageous embodiment of the method, phase differences between the first reference beam and the returned first measurement beam and between the second reference beam and the returned second measurement beam can be determined separately for the fundamental frequency and the second harmonic in the receiving unit in separable frequency bands. In this way, detection can advantageously be carried out with only one receiving unit, without reaching signal mixing. The method thus enables an advantageous reduction in the number of components required for the optical device.

According to an advantageous embodiment of the method, a relative dispersion between the fundamental frequency and the second harmonic can be determined by, in particular numerical, subtraction of the phase differences. The dispersion phases and the relative dispersion, namely the refractive index difference between the fundamental frequency and the second harmonic, are advantageously determined purely numerically and/or digitally directly from the photodiode signal of the receiving unit.

Compared to the prior art, a second non-linear optical frequency conversion stage, but also an electrical frequency conversion stage, can thus be dispensed with. In addition, the system achieves significant measuring accuracy even with small amounts of measurement light.

BRIEF DESCRIPTION OF THE DRAWINGS

Further advantages will be apparent from the following description of the drawings. Exemplary embodiments of the invention are shown in the figures. The figures, the description, and the claims contain numerous features in combination. A person skilled in the art will expediently also consider the features individually and combine them into further meaningful combinations.

In the exemplary figures.

DETAILED DESCRIPTION

In the figures, identical or identically acting components are identified by the same reference signs. The figures only show examples and are not to be understood as restrictive.

Directional terminology used in the following with terms such as "left", "right", "above", "below", "in front of", "behind", "after", and the like only serves for better comprehension of the figures and is in no way intended to restrict the generality. The components and elements shown, their design and use can vary according to the considerations of a person skilled in the art and can be adapted to the respective applications.

Figure 1:
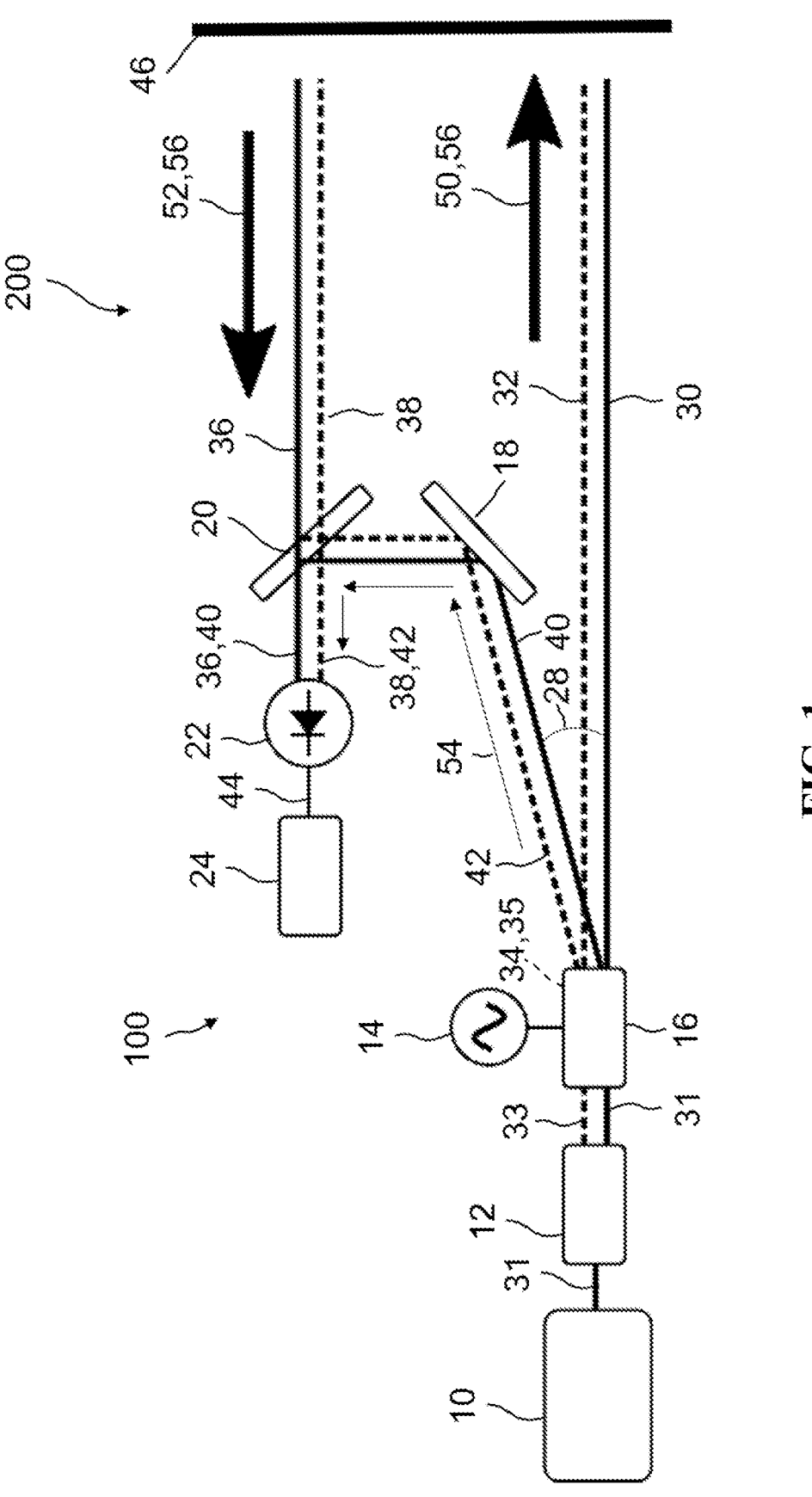
FIG. 1 shows a system for dispersion interferometry with an optical device according to an exemplary embodiment of the invention in a schematic representation.

FIG. 1 shows a system 200 for dispersion interferometry with an optical device 100 according to an exemplary embodiment of the invention in a schematic representation;

The optical device 100 has a laser beam source 10 for emitting a first laser beam 31 with a fundamental frequency of the laser beam source 10 and a frequency doubling device 12 and an optical modulation device 16 which is controlled by an oscillator 14 with a modulation frequency. The frequency doubling device 12 is arranged in the transmission beam path 50 before the optical modulation device 16.

A second laser beam 33 is generated by the frequency doubling device 12. First and second diffracted laser beams 34, 35 are generated from the first and second laser beams 31, 33 by frequency modulation with a modulation frequency in the optical modulation device 16.

The first diffracted laser beam 34 has an intensity of the first diffraction order of the modulated fundamental frequency, while the second diffracted laser beam 35 has an intensity of the second diffraction order of the second harmonic.

The second laser beam 33 is generated from the first laser beam 31 in the frequency doubling device 12 at a frequency of a second harmonic of the fundamental frequency. The frequency of the first laser beam 31 of the laser beam source 10, for example a continuous wave laser, is thus doubled in the frequency doubling device 12, for example a non-linear optical crystal. Except for a small offset angle, which can optionally be compensated with at least one wedge, the optical beams of the fundamental frequency and the second harmonic run collinearly through the transmission beam path 50 of the optical device 100.

Both laser beams 31, 33 pass through the optical modulation device 16, in which the first diffracted laser beam 34 and the second diffracted laser beam 35 are generated therefrom by frequency modulation with a modulation frequency. An acousto-optic modulator or frequency shifter 16, by applying a high-frequency signal from the oscillator 14 to the Bragg crystal contained in the frequency shifter 16, diffracts part of the light as a diffracted laser beam 34, 35 at a small angle away from the first and second laser beams 31, 33. The first diffracted laser beam 34 has an intensity of the first diffraction order of the fundamental frequency and the second diffracted laser beam 35 has an intensity of the second diffraction order of the second harmonic.

The Bragg crystal can advantageously be rotated in such a way that the first diffraction order for the fundamental frequency and the second diffraction order for the second harmonic fulfill the diffraction condition or Bragg condition. In contrast to the prior art, the beams diffracted in this way are still collinear.

The first and second diffracted laser beams 34, 35 are emitted collinearly at an angle 28 greater than 0 mrad relative to the first and second laser beams 31, 33. In particular, the angle 28 can be at most 50 mrad, preferably at most 10 mrad.

The first and second laser beams 31, 33 are emitted as a measurement beam 30, 32 in a transmission beam path 50 onto an optical element 46. The optical element 46 can reflect and/or scatter the first and second measurement beam 30, 32. A first and second measurement beam 36, 38 returned by the optical element 46, are received in a reception beam path 52. The transmission beam path 50 and the reception beam path 52 can be identical.

The first and second measurement beam 30, 32 and the first and second measurement beam 30, 32 returned by the optical element 46 pass through the medium, the dispersion of which is to be determined, on their way from the optical device 100 to the optical element 46 and back again.

The first and second diffracted laser beams 34, 35 are imaged as a reference beam 40, 42 in a reference beam path 54 by deflection via a mirror 18 and a superposition unit 20, which is implemented, for example, by a beamsplitter in the form of a semi-transparent mirror, onto a receiving unit 22.

Alternatively, the first and second diffracted laser beam 34, 35 can also be used as a first and second measurement beam 30, 32 and the first and second laser beam 31, 33 can be used as the first and second reference beam 40, 42.

After passing through the superposition unit 20, the returned first and second measurement beams 36, 38 are superimposed with the first and second reference beams 40, 42 and imaged on the receiving unit 22.

The superposition unit 20 superimposes the first reference beam 40 on the returned first measurement beam 36 and the second reference beam 42 on the returned second measurement beam 38.

The sum of the length of the transmission beam path 50 and the reception beam path 52 is referred to as the measurement arm length 56 of the interferometer. The optical device 100 can advantageously be operated with a variable measurement arm length 56, for example by folding a further reflector into the reception beam path 52. In this way, an absolute calibration of the intensity of the optical beams 30, 32, 36, 38, 40, 42 can be carried out.

The returned measurement beam 36, 38 is superimposed at the beamsplitter 20 with the reference beam 40, 42 and is imaged on the receiving unit 22, which can be a photodiode, for example.

In the exemplary embodiment in FIG. 1, the superposition unit 20 is embodied as a beamsplitter, wherein the returned first and second measurement beams 36, 38 pass through the superposition unit 20 and the first and second reference beams 40, 42 are reflected by the superposition unit 20.

The interference arising there contains a beat signal at the modulation frequency of the acousto-optic modulation device 16 and the second harmonic thereof. These beat signals can be assigned directly to the respective returned measurement signals 36, 38 and separated into separate frequency bands.

The receiving unit 22 receives the superimposed returned first and second measurement beams 36, 38 and first and second reference beams 40, 42 and converts them into an electrical reception signal 44.

An evaluation unit 24 receives, digitizes and evaluates the electrical reception signal 44.

The electrical reception signal 44 can advantageously be digitized in the evaluation unit 24 using an analog/digital converter. The two band-limited signals are demodulated, for example quadrature demodulated, and low-pass filtered using digital signal processing. The relative dispersion between the fundamental frequency and the second harmonic can thus be determined by numerical subtraction. The relative dispersion is directly dependent on the environmental parameters, such as pressure, temperature, air humidity, $CO_2$ content and thus enables these parameters to be measured. The purely digital processing simplifies the measurement setup considerably.

For this purpose, the electrical reception signal 44 is mixed in the evaluation unit 24 by a two-tone signal $(\omega+\Delta\Omega)+2(\omega+\Delta\Omega)$ with a deviation $\Delta\Omega$ from the fundamen-

11 tal frequency ω, in particular with the modulation frequency ΔΩ, to the frequencies ΔΩ and 2 ΔΩ.

Phase differences between the first reference beam 40 and the returned first measurement beam 36 as well as the second reference beam 42 and the returned second measurement beam 38 are determined in the receiving unit 22 separately in separable frequency ranges for the fundamental frequency and the second harmonic.

A relative dispersion between the fundamental frequency and the second harmonic can be determined by, in particular numerical, subtraction of the phase differences.

According to the method according to the invention for dispersion interferometry using the optical device 100, a first laser beam 31 is emitted by the laser beam source 10 with the fundamental frequency of the laser beam source 10. The wave equation of laser light is as follows:

$$\sin(\omega t - kx)$$
$$k = \frac{\omega n}{c} = \frac{2\pi n}{\lambda_{vacuum}}$$

wherein ω is the angular frequency of the laser radiation (2π*fundamental frequency of the laser light), t is the time, k is the wave vector, x is the location along the transmission beam path 50, n is the (frequency-dependent) refractive index of the medium passed through, c is the speed of light, $\lambda_{vacuum}$ is the wavelength of laser radiation in a vacuum.

A second laser beam 33 is generated at the frequency 2ω of the second harmonic of the fundamental frequency ω by means of the frequency doubling device 12. A first diffracted laser beam 34 and a second diffracted laser beam 35 are generated by the optical modulation device 16 with an offset ΔΩ to the fundamental frequency ω or an offset 2ΔΩ to twice the fundamental frequency 2ω.

The first diffracted laser beam 34 has an intensity of the first diffraction order of the fundamental frequency, while the second diffracted laser beam 35 has an intensity of the second diffraction order of the second harmonic. The first and second diffracted laser beams 34, 35 are thus emitted collinearly at an angle 28 relative to the first and second optical beam 32, 34. In particular, the angle 28 can be at most 50 mrad, preferably at most 10 mrad.

The first and second diffracted laser beams 34, 35 are imaged as first and second reference beams 40, 42 in a reference beam path 54 onto the receiving unit 22. The first and second laser beams 31, 33 are emitted as a first and second measurement beam 30, 32 in a transmission beam path 50 onto an optical element 46.

Alternatively, the first and second diffracted laser beam 34, 35 can also be emitted as a first and second measurement beam 30, 32 and the first and second laser beam 31, 33 can be emitted as a first and second reference beam 40, 42.

A first and second measurement beam 36, 38 returned by the optical element 46 is received in a reception beam path 52 and superimposed with the first and second reference beam 40, 42 by a superposition unit 20 and imaged on the receiving unit 22.

The receiving unit 22 receives the superimposed returned first and second measurement beams 36, 38 and first and second reference beams 40, 42 and converts them into an electrical reception signal 44. The electrical reception signal 44 is received and digitized by an evaluation unit 24.

After passing through the medium, the dispersion of which is to be determined, on the way along the transmission beam path 50 and the reception beam path 52, the phases $\phi_\omega$,

12

$\phi_{2\omega}$ of the laser light of the returned first and second measurement beams 36, 38 result at the receiving unit 22:

$$\phi_\omega = \omega t - \frac{2\pi n(\omega)(l + l_{vibration})}{\lambda}$$
$$\phi_{2\omega} = 2\omega t - \frac{2\pi n(\omega)(l + l_{vibration})}{\frac{\lambda}{2}}$$

l represents the measuring arm length 56 of the interferometer, namely the sum of the lengths of the transmission beam path 50 and the reception beam path 52. $l_{vibration}$ represents a change in the measuring arm length 56 of the interferometer due to mechanical vibrations.

The phases of the laser light of the two reference beams 40, 42 result in:

$$\phi_{\omega reference} = (\omega + \Delta\Omega)t + \Phi_{NCP}$$

$$\phi_{2\omega reference} = 2(\omega + \Delta\Omega)t + \Phi_{NCP2\omega}$$

wherein ΔΩ represents the modulation frequency of the modulation device 16, predetermined by the oscillator 14, and $\Phi_{NCP}$, $\Phi_{NCP2\omega}$ represent the phases of a so-called "non common path" (NCP). The non-common path represents the part of the beam path on which the first and second reference beam 40, 42 are not superimposed with the returned first and second measurement beam 36, 38, namely the beam path between the optical modulation device 16 via the mirror 18 to the superposition unit 20.

If the phases $\phi_\omega$, $\phi_{2\omega}$ of the returned measurement beams 36, 38 are subtracted from the phases $\phi_{\omega reference}$, $\phi_{2\omega reference}$ of the respective reference beams 40, 42, phase differences $\Delta\Phi_\omega$, $\Delta\Phi_{2\omega}$ measured in the receiving unit 22 result:

$$\Delta\Phi_\omega = \Delta\Omega t + \Phi_{NCP} + \frac{2\pi n(\omega)(l + l_{vibration})}{\lambda}$$
$$\Delta\Phi_{2\omega} = 2\Delta\Omega t + \Phi_{NCP2\omega} + \frac{2\pi n(2\omega)(l + l_{vibration})}{\frac{\lambda}{2}}$$

The evaluation of the phase differences in the evaluation unit 24 thus yields:

$$\Delta\Phi_{2\omega} - 2\Delta\Phi_\omega = \Phi_{NCP2\omega} - 2\Phi_{NCP} + (n(2\omega) - n(\omega))\frac{2\pi(l + l_{vibration})}{\frac{\lambda}{2}}$$
$$\approx \Phi_{NCP2\omega} - 2\Phi_{NCP} + (n(2\omega) - n(\omega))\frac{2\pi l}{\frac{\lambda}{2}} \text{ with } l \gg l_{vibration}.$$

Thus, the refractive index difference n(2ω)−n(ω) of the dispersion of the medium can be determined.

Figure 2:
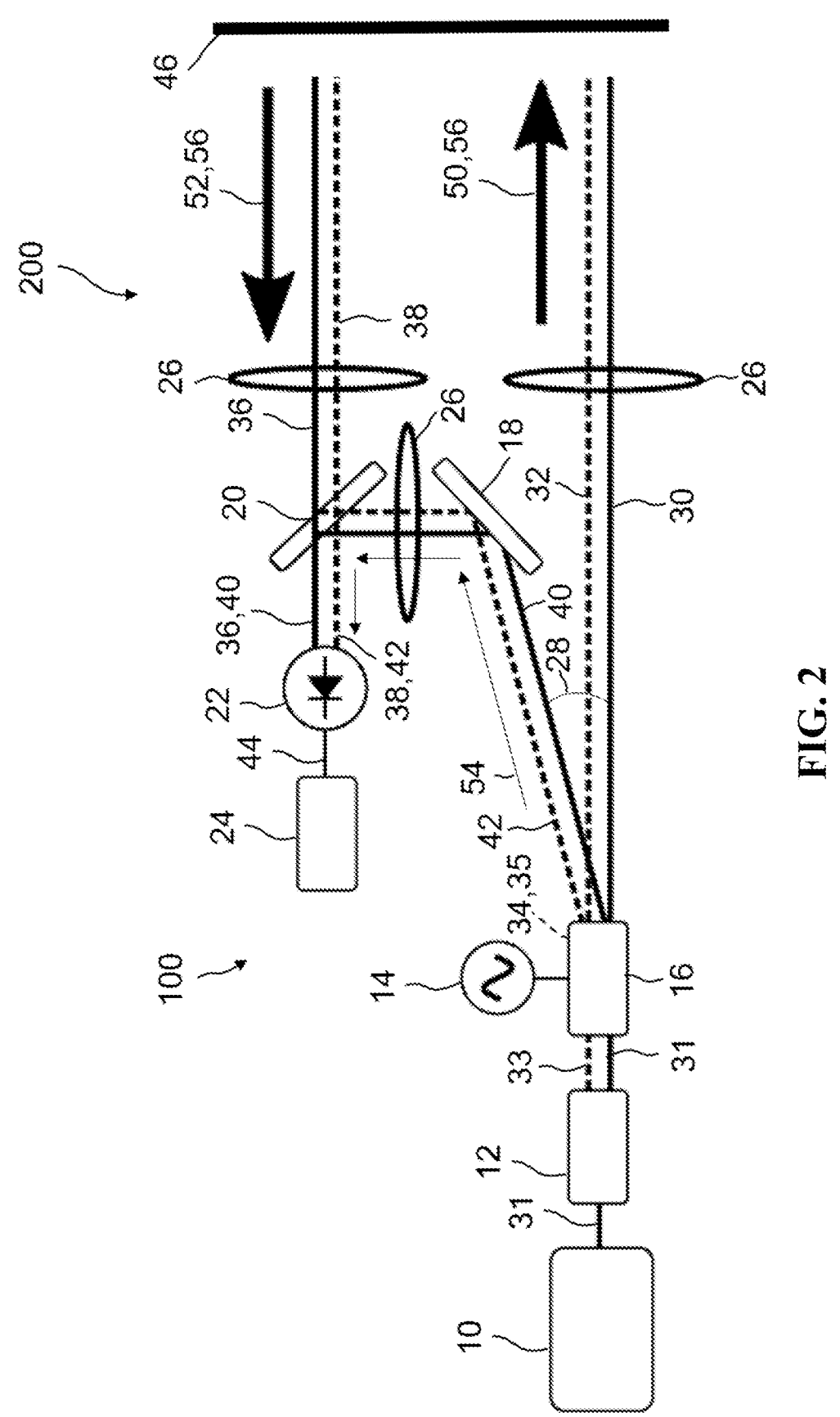
FIG. 2 shows a system for dispersion interferometry with an optical device according to a further exemplary embodiment of the invention with an additional optical system in a schematic representation.

FIG. 2 shows a system 200 for dispersion interferometry with an optical device 100 according to a further exemplary embodiment of the invention with an additional optical system 26 in a schematic representation.

The optical system 26 can be arranged in the reference beam path 54 and/or in the transmission beam path 50 and/or in the reception beam path 52 for beam adjustment. The optical system 26 also has beam shaping optics, which can optionally be implemented in the beam path 50, 52, 54.

The optics are used to adjust the beam propagation, which is different in the reference beam path 54 with respect to the transmission beam path 50 and reception beam path 52, so that the interference of the beams 36, 38, 40, 42 is maximized. In the exemplary embodiment illustrated in FIG. 2, one optic of the optical system 26 is respectively arranged in the transmission beam path 50, in the reception beam path 52 and in the reference beam path 54 between the mirror 18 and the superposition unit 20. The optical system 26 can be a lens system, for example, as shown in FIG. 2. Alternatively, the optical system 26 can also comprise mirrors and/or holographic elements.

Figure 3:
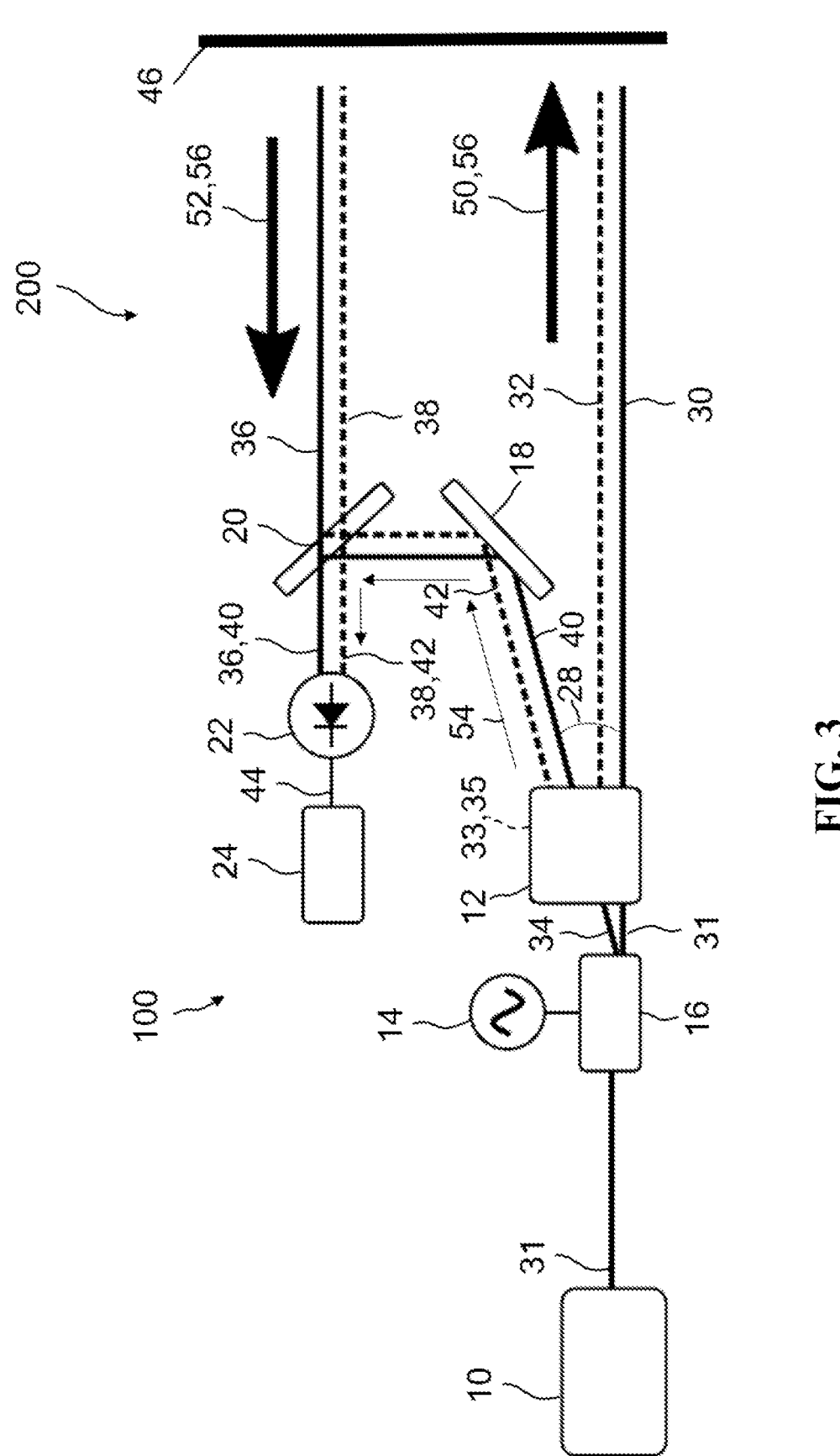
FIG. 3 shows a system for dispersion interferometry with an optical device according to a further exemplary embodiment of the invention with swapped frequency doubling device and modulation device in a schematic representation.

FIG. 3 shows a system 200 for dispersion interferometry with an optical device 100 according to a further exemplary embodiment of the invention with swapped frequency doubling device 12 and modulation device 16 in a schematic representation.

The first diffracted laser beam 34 is generated by frequency modulation with the modulation frequency in the optical modulation device 16 and the second laser beam 33 and the second diffracted laser beam 35 are generated by the frequency doubling device 12.

The frequency doubling device 12 is arranged in the transmission beam path 50 after the optical modulation device 16. In this alternative embodiment, the first diffracted laser beam 34 is first generated from the first laser beam 31 at the fundamental frequency by means of the modulation device 16, before the second laser beam 33 of the second harmonic is then generated from the first laser beam 31 by frequency doubling and the second diffracted laser beam 35 is generated from the first diffracted laser beam 34. For reasons of arrangement, two separate frequency doubling devices 12 for the first and second laser beams 31, 33 and for the two diffracted laser beams 34, 35 may be required.

Figure 4:
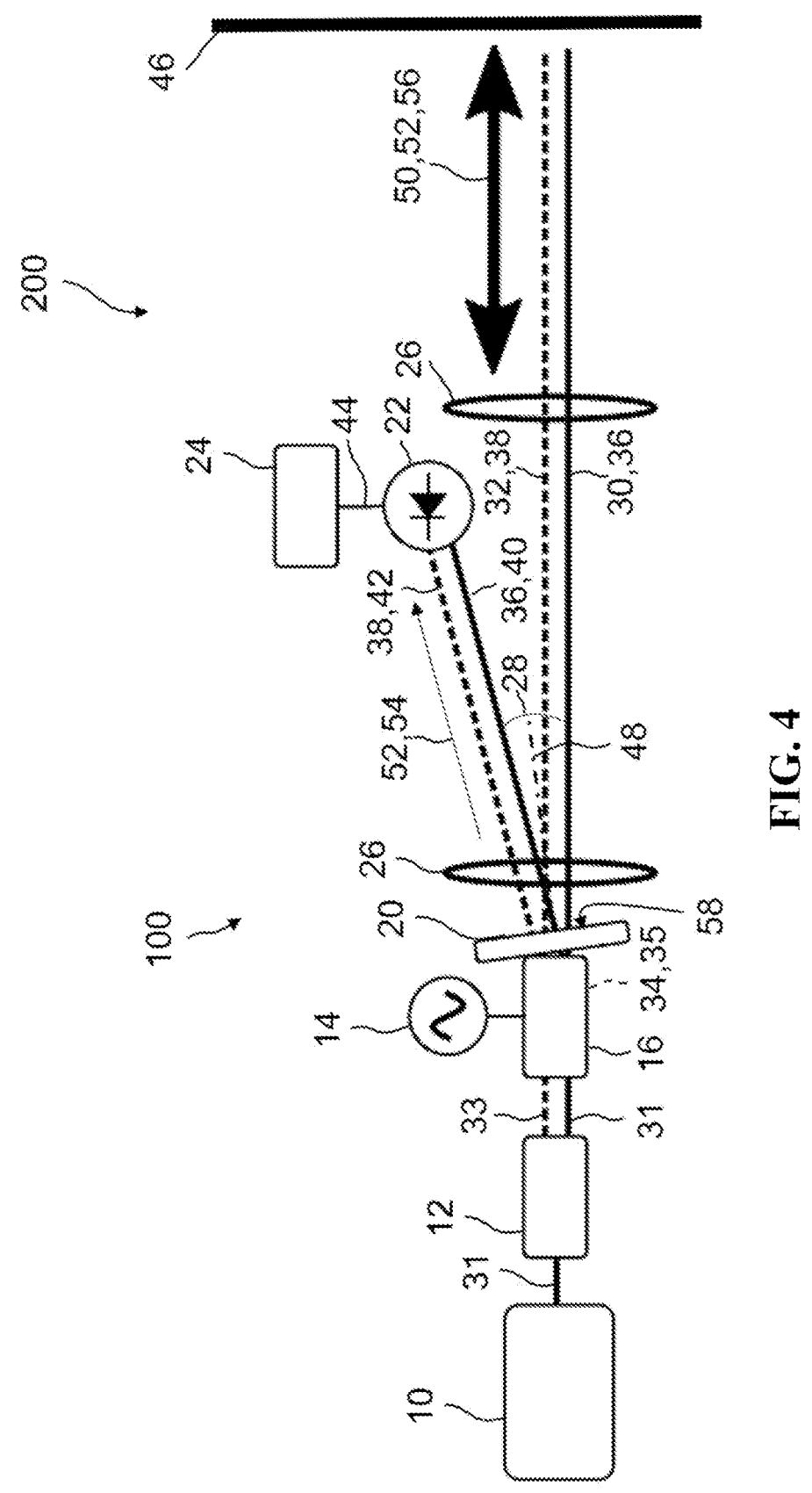
FIG. 4 shows a system for dispersion interferometry with an optical device according to a further exemplary embodiment of the invention, in which the returned measurement beams are deflected, in a schematic representation.

FIG. 4 shows a system 200 for dispersion interferometry with an optical device 100 according to a further exemplary embodiment of the invention, in which the returned measurement beams 36, 38 are deflected, in a schematic representation.

In this exemplary embodiment, the transmission beam path 50 and the reception beam path 52 are designed to be collinear. These can be split again into separate beam paths using conventional methods, such as beamsplitters, and can therefore be further processed as before.

Alternatively, as shown in FIG. 4, the superposition unit 20 designed as a beamsplitter can be arranged directly after the modulation device 16. For example, the beamsplitter can be formed by an equivalently angled and coated facet of the modulation device 16.

The returned first and second measurement beams 36, 38 are reflected by the superposition unit 20, while the first and second measurement beams 30, 32 and the first and second reference beams 40, 42 pass through the superposition unit 20.

The normal vector 48 of the beamsplitter surface 58 lies on the bisector of the angle between the reflected, returned measurement beam 36, 38 or reference beam 40, 42 and the measurement beam 30, 32. In this way, the returned measurement beam 36, 38 is reflected onto the reference beam 40, 42 and made to interfere.

In addition, to compensate for beam changes due to propagation, compensation optics can be mounted in both or one of the two beam paths 50, 52; 54. The first and second measurement beams 30, 32 as well as the returned first and second measurement beams 36, 38 can also, as shown in FIG. 4, be imaged by elements of an optical system 26, such as lenses or objectives, onto the optical element 46, as well as the reception unit 22.

Figure 5:
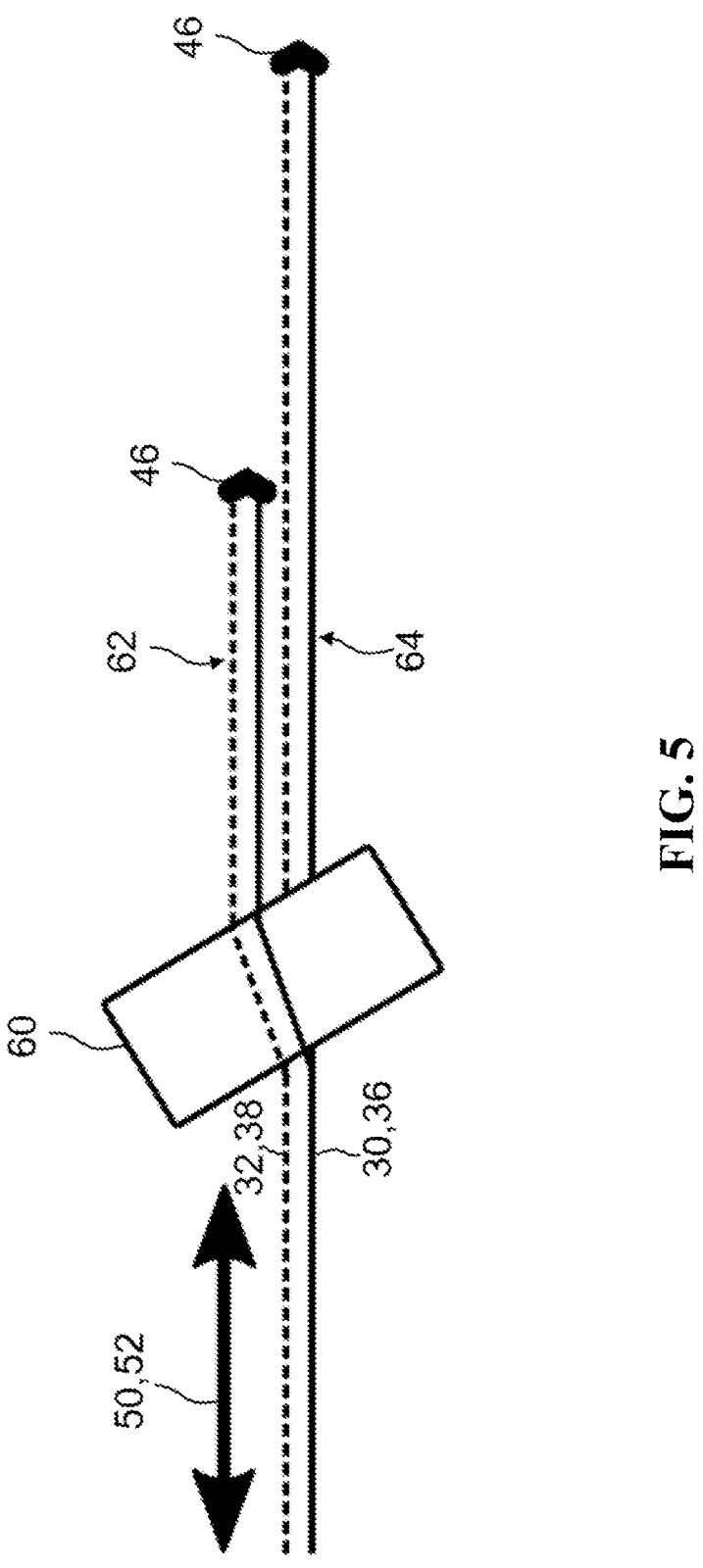
FIG. 5 shows a splitting of the transmission beam path and/or reception beam path into different beam paths according to a further exemplary embodiment.

FIG. 5 shows a splitting of the transmission beam path 50 and/or the reception beam path 52 into different beam paths 62, 64 according to a further exemplary embodiment.

FIG. 5 shows how it is possible to switch between different beam paths 62, 64 in the beam path 50, 52. Typically, the measurement beam 30, 32 can be guided differently through a measuring volume by beam offset or beam deflection, for example by a scanner, so that a suitable optical element 46 in the form of a reflector or scatterer is impinged upon. By varying the measurement distance, free parameters in the evaluation of the measured phases can be calibrated with respect to pressure or gas concentration without having to resort to additional measuring systems. Typical methods to manipulate the beam are polarizing beamsplitters and a polarization rotating element such as a rotatable lambda/2 plate, as well as rotatable prisms or mirrors, liquid crystals and the like.

For this purpose, a beam deflection unit 60 can be arranged in the transmission beam path 50 and/or in the reception beam path 52, which unit splits the transmission beam path 50 and/or the reception beam path 52 into a first beam path 62 and a second beam path 64. In particular, the first beam path 62 or the second beam path 64 can be selected as the transmission beam path 50 and/or as the reception beam path 52 by means of the beam deflection unit 60. Alternatively, a second receiving unit 22 can be added in order to evaluate both beam paths 62, 64 in parallel.

LIST OF REFERENCE NUMERALS

10 laser beam source
12 frequency doubling device
14 oscillator
16 optical modulation device
18 mirror
20 superposition unit
22 receiving unit
24 analysis unit
26 optical system
28 angle
30 first measurement beam
31 first laser beam
32 second measurement beam
33 second laser beam
34 first diffracted laser beam
35 second diffracted laser beam
36 returned first measurement beam
38 returned second measurement beam
40 first reference beam
42 second reference beam
44 electrical reception signal
46 optical element
48 normal vector
50 transmission beam path
52 reception beam path
54 reference beam path
56 arm length of interferometer
58 beamsplitter surface
60 beam deflection unit
62 first beam path
64 second beam path

The invention claimed is:

1. An optical device, comprising a laser beam source for emitting a first laser beam having a fundamental frequency of the laser beam source;

a frequency doubling device and an optical modulation device for generating a second laser beam at a frequency of a second harmonic of the fundamental frequency, and a first diffracted laser beam having an intensity of the first diffraction order of a modulated fundamental frequency, and a second diffracted laser beam having an intensity of the second diffraction order of the second harmonic;

a reference beam path which is designed to image a first and second reference beam onto a receiving unit;

a transmission beam path which is designed to emit a first and second measurement beam onto an optical element;

a reception beam path which is designed to receive a first and second measuring beam returned by the optical element;

a superposition unit which is used for superimposing the first and second reference beams on the returned first and second measurement beams and for imaging the superimposed returned first and second measurement beams and first and second reference beams onto the receiving unit, wherein the receiving unit is configured for receiving the superimposed returned first and second measuring beams and first and second reference beams and for converting them into an electrical reception signal;

and an evaluation unit which is configured to at least evaluate the electrical reception signal, wherein the first and second measurement beams are configured as first and second laser beams and the first and second reference beams are configured as first and second diffracted laser beams, or wherein the first and second measurement beams are configured as first and second diffracted laser beams and the first and second reference beams are configured as first and second laser beams.

2. The optical device according to claim 1, wherein the frequency doubling device is arranged in the transmission beam path before the optical modulation device.

3. The optical device according to claim 1, wherein the frequency doubling device is arranged in the transmission beam path after the optical modulation device.

4. The optical device according to claim 1, wherein the frequency doubling device has at least one wedge, by means of which an offset angle between the first laser beam and the second laser beam can be compensated by at least one wedge.

5. The optical device according to claim 1, wherein the first and second diffracted laser beams are emitted collinearly at an angle greater than 0 mrad relative to the first and second laser beams.

6. The optical device according to claim 1, wherein the superposition unit is designed as a beamsplitter, wherein the returned first and second measuring beams pass through the superposition unit and the first and second reference beams are reflected by the superposition unit, or wherein the returned first and second measurement beams are reflected by the superposition unit and the first and second measurement beam and the first and second reference beam pass through the superposition unit.

7. The optical device according to claim 6, wherein a normal vector of the beamsplitter surface lies on a bisector between the reference beams and the returned measurement beams.

8. The optical device according to claim 1, wherein an optical system for beam adjustment is arranged in the reference beam path and/or in the transmission beam path and/or in the reception beam path.

9. The optical device according to claim 1, wherein a beam deflection unit is arranged in the transmission beam path and/or in the reception beam path, in which the beam deflection unit splits the transmission beam path and/or the reception beam path into at least one first beam path and a second beam path.

10. The optical device according to claim 1, wherein at least one mirror for deflecting the first and second reference beams and/or the first and second measurement beams and/or the returned first and second measurement beams is arranged in the reference beam path and/or in the transmission beam path and/or in the reception beam path.

11. A system for dispersion interferometry, at least comprising an optical device according to claim 1.

12. A method for dispersion interferometry with an optical device, comprising:

emitting a first laser beam by means of a laser beam source having a fundamental frequency of the laser beam source;

generating a second laser beam at a frequency of a second harmonic of the fundamental frequency, and a first diffracted laser beam having an intensity of the first diffraction order of a modulated fundamental frequency, and a second diffracted laser beam having an intensity of the second diffraction order of the second harmonic frequency by means of a frequency doubling device and an optical modulation device;

imaging a first and second reference beam in a reference beam path onto a receiving unit;

emitting a first and second measurement beam in a transmission beam path onto an optical element;

receiving a first and second measuring beam returned by the optical element in a reception beam path;

superimposing the returned first and second measurement beams on the first and second reference beams by a superposition unit and imaging onto the receiving unit;

receiving the superimposed returned first and second measurement beams and the first and second reference beams by the receiving unit and converting into an electrical reception signal;

evaluating the received electrical signal by an evaluation unit, wherein the first and second measurement beams are configured as first and second laser beams and the first and second reference beams are configured as first and second diffracted laser beams, or wherein the first and second measurement beams are configured as first and second diffracted laser beams and the first and second reference beams are configured as first and second laser beams.

13. The method according to claim 12, wherein the second laser beam is generated from the first laser beam by the frequency doubling device and the first and second diffracted laser beams are generated from the first and second laser beams by frequency modulation with a modulation frequency in the optical modulation device.

14. The method according to claim 12, wherein the first diffracted laser beam is generated from the first laser beam by frequency modulation with a modulation frequency in the optical modulation device and the second laser beam and the second diffracted laser beam are generated from the first laser beam and the first diffracted laser beam by the frequency doubling device.

15. The method according to claim 12, wherein an offset angle between the first laser beam and the second laser beam is compensated for by at least one wedge.

16. The method according to claim 12, wherein the first and second diffracted laser beams are emitted collinearly at an angle relative to the first and second laser beams.

17. The method according to claim 12, wherein the returned first measuring beam is superimposed with the first reference beam and the returned second measuring beam is superimposed with the second reference beam by the superposition unit.

18. The method according to claim 12, wherein the electrical reception signal is demodulated and/or filtered in the evaluation.

19. The method according to claim 12, wherein phase differences between the first reference beam and the returned first measurement beam as well as the second reference beam and the returned second measurement beam are determined in the receiving unit separately in separable frequency ranges for the fundamental frequency and the second harmonic.

20. The method according to claim 19, wherein a relative dispersion between the fundamental frequency and the second harmonic is determined by difference formation of the phase differences.

* * * * *